United States Patent [19]

Chevalier et al.

[11] Patent Number: 5,007,131
[45] Date of Patent: Apr. 16, 1991

[54] BLADE CARRYING ASSEMBLY FOR A WINDSHIELD WIPER INCLUDING A LOCK

[75] Inventors: Jean-Claude Chevalier, Issoire; Guy Raymond, Champeix, both of France

[73] Assignee: Valeo Systems d'Essuyage, Issy-Les-Moulineaux, France

[21] Appl. No.: 324,537

[22] Filed: Mar. 16, 1989

[30] Foreign Application Priority Data

Mar. 22, 1988 [FR] France .................. 88 03699

[51] Int. Cl.⁵ .............................................. A47L 1/02
[52] U.S. Cl. ........................ 15/250.19; 15/250.31; 15/250.34
[58] Field of Search .......... 15/250.34, 250.31, 250.17, 15/250.35, 250.2; 403/321, 316, 317

[56] References Cited

U.S. PATENT DOCUMENTS

| 2,736,053 | 2/1956 | Oisnei et al. | 15/250.19 |
| 3,041,093 | 6/1962 | Bonfiglio | 15/250.34 |
| 3,937,585 | 2/1976 | Cattermole | 403/321 X |
| 4,566,146 | 1/1986 | Harbison | 15/250.34 |
| 4,601,603 | 7/1986 | Wakayama | 403/321 X |
| 4,637,091 | 1/1987 | Wu | 15/250.34 |
| 4,704,761 | 11/1987 | South et al. | 15/250.19 |
| 4,815,887 | 3/1987 | Sieford et al. | 403/321 |

Primary Examiner—Frankie L. Stinson
Attorney, Agent, or Firm—Wenderoth, Lind & Ponack

[57] ABSTRACT

A blade carrying assembly for a windshield wiper for an automotive vehicle includes a wiper arm pivoted on a coupling head, with a spring biassing the wiper arm towards the coupling head. A rotatable lock is provided on the wiper arm for limiting the pivoting movement of the arm with respect to the couping head when the lock is in a locking position.

10 Claims, 2 Drawing Sheets

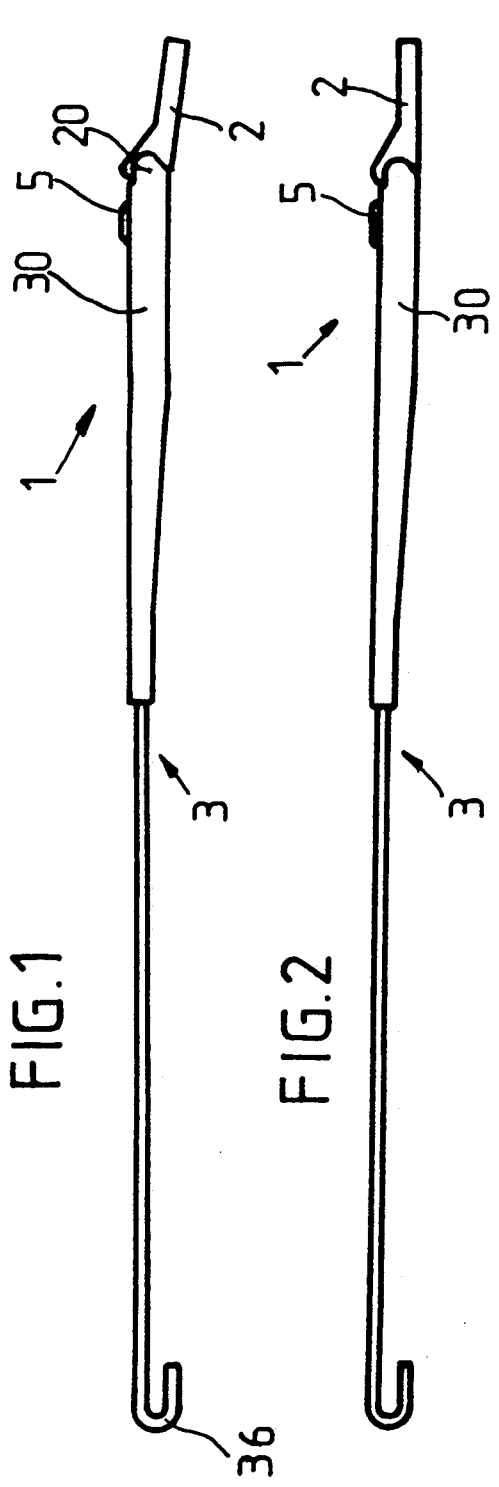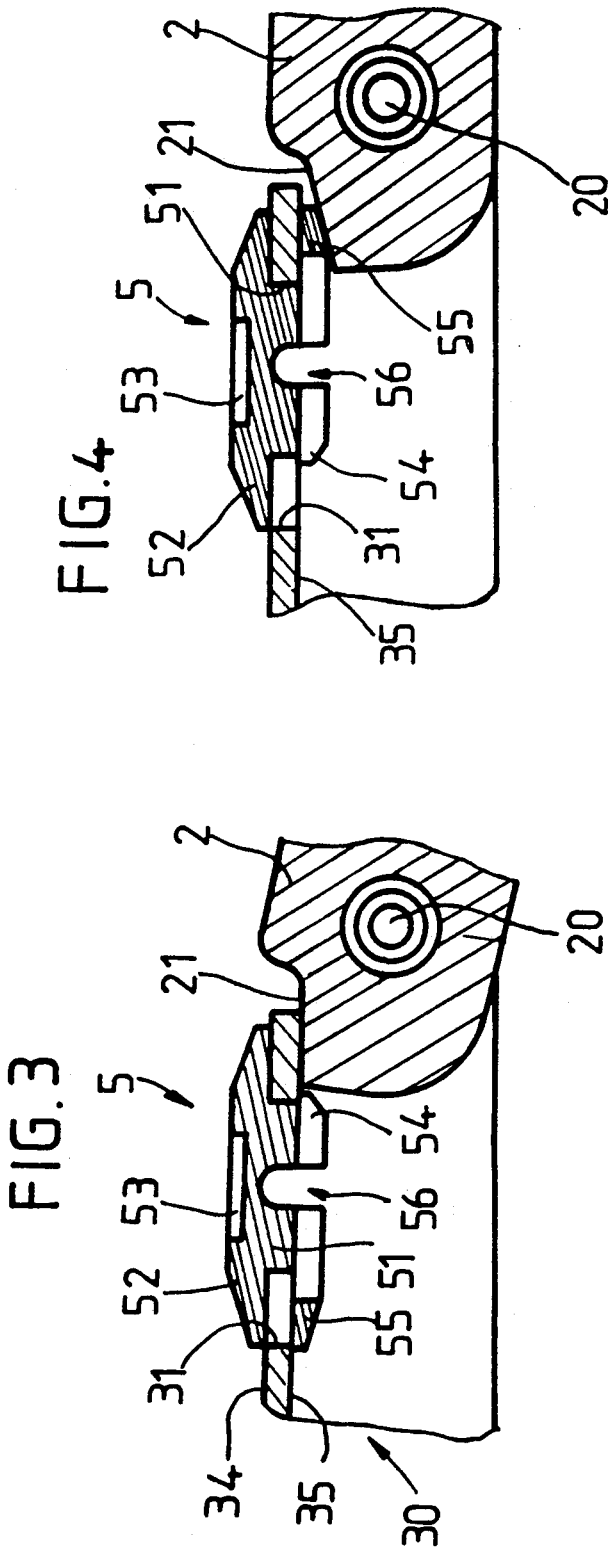

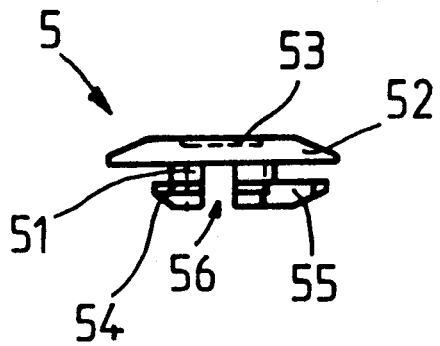
FIG. 5
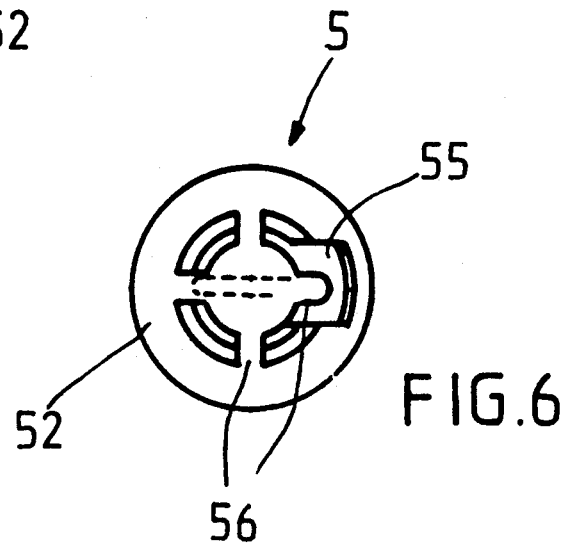
FIG. 6
FIG. 7
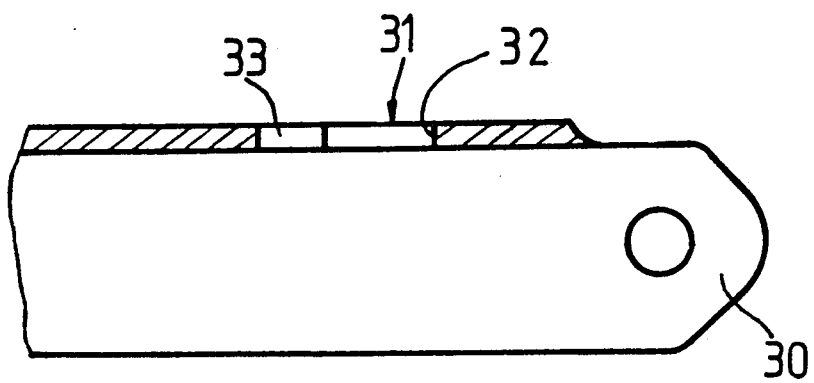
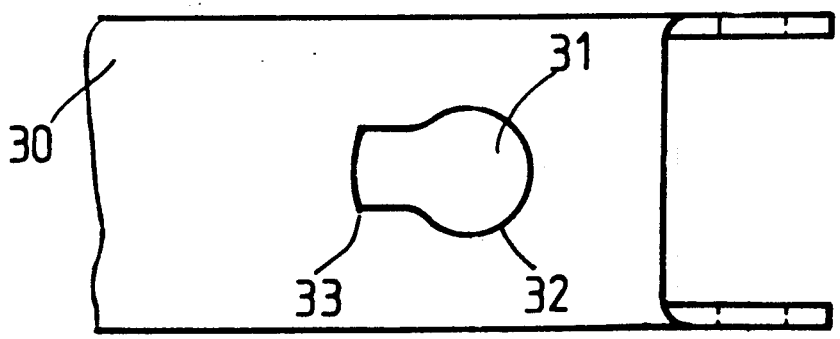
FIG. 8

BLADE CARRYING ASSEMBLY FOR A WINDSHIELD WIPER INCLUDING A LOCK

FIELD OF THE INVENTION

The present invention relates to a blade carrying assembly for a windshield wiper, of the kind comprising a coupling head and a wiper arm articulated on the coupling head.

BACKGROUND OF THE INVENTION

In such a blade carrying assembly, the wiper arm conventionally includes a shroud portion at its inner end. The shroud portion is normally of a generally U-shaped cross section, with the sides of the shroud portion flanking the coupling head, and a pivot, which is secured by riveting, providing the necessary articulation between the shroud portion and the coupling head.

At the end of the wiper arm opposite that to which the coupling head is attached, a windshield wiper blade, for sweeping the windshield, is attached by means of a hooked connection. To optimise the operating conditions for sweeping the windshield, it is necessary to provide means for applying a pressure to urge the wiper blade towards the windshield. For this purpose a traction spring is fitted in such a way as to bias the wiper arm towards the coupling head, and therefore towards the windshield.

When replacement of the wiper blade is necessary, or when the blade carrying assembly is to be removed, the arm is swung out, that is to say it is moved to a position in which it is no longer urged against the windshield by the force exerted by the spring. This operation of swinging the wiper out is generally performed by rotating the wiper arm with respect to the coupling head in a direction away from the windshield, and into a position in which the anchor point of the spring on the wiper arm has passed behind (with reference to the windshield) the anchor point of the spring on the coupling head, so that the force exerted by the traction spring then holds the wiper blade away from the windshield.

This method places the wiper arm into a quasi-perpendicular position with respect to the coupling head and therefore with respect to the chassis of the vehicle. In modern vehicles on which the coupling head is placed beneath an edge of the bodywork overlying the hood of the vehicle, this is no longer possible, because with such an arrangement it is only possible to displace the wiper arm a few degrees about the pivot axis coupling the arm to the coupling head.

There is therefore a need to provide an alternative arrangement in which the spring can be prevented from exerting its biassing force within the small range of displacement available for the arm.

It has already been proposed, in patent application No. 35 08542 filed in the Federal Republic of Germany on 9th Mar. 1985, to provide means for transmitting force between the spring and the wiper arm. These force transmitting means comprise a lever on which the spring acts, together with a coupling member between this lever and the wiper arm. The coupling member is actuated in a simple manner so as to separate the lever and the wiper arm. The spring then no longer acts on the arm, so that the latter can be displaced as required. This arrangement, however, has the disadvantage that, since the arm is thus freely rotatable with respect to the coupling head, the person working on the windshield wiper must take care not to allow it to come into contact with the vehicle hood and so run the risk of damaging the paintwork.

SUMMARY OF THE INVENTION

An object of the present invention is to resolve this problem in a simple way.

According to the invention, there is provided a blade carrying assembly for a windshield wiper comprising a coupling head, a wiper arm articulated to the coupling head, and a spring biassing the wiper arm towards the coupling head, wherein the blade carrying assembly further comprises a lock disposed on the wiper arm, such lock having means for enabling rotation of the lock and locking means for limiting the rotation of the wiper arm with respect to the coupling head.

The lock which is provided in accordance with the invention forms an abutment or wedge between the wiper arm and the coupling head, which opposes the action of the spring. The locking position of the lock is such that, when the coupling head is mounted on the vehicle, the free end of the wiper arm, carrying the wiper blade itself, is spaced away from the windshield. In this way, not only can the wiper arm be easily mounted on the vehicle, but also changing of the wiper blade is facilitated.

Other advantages of the present invention will appear from the description which follows, and which is given with reference to the accompanying drawings.

BRIEF DESCRIPTION OF THE DRAWINGS

FIG. 1 is a schematic elevation view showing an arm assembly in its free state.

FIG. 2 is a similar view of the arm assembly in its locked position.

FIG. 3 is a partial view on a larger scale, showing the arm assembly of FIG. 1 in cross section.

FIG. 4 is a view similar to FIG. 3 but showing the arm assembly in the locked position of FIG. 2.

FIG. 5 is a side view of a lock.

FIG. 6 is a top view of the lock.

FIG. 7 is a partial cross sectional view of a wiper arm.

FIG. 8 is a partial view of the wiper arm seen from above.

DESCRIPTION OF A PREFERRED EMBODIMENT

Referring to the drawings, a blade carrying assembly 1 of a windshield wiper comprises a coupling head 2 and a wiper arm 3, which are articulated for rotational movement with respect to each other about a pivot axis 20. As will be noticed from FIG. 1, the arm 3 forms an obtuse angle with the coupling head 2, this angle being due to the traction force exerted by a spring, shown schematically in FIG. 3, which is situated within a shroud portion 30 of the arm. One end of this spring is fixed to the shroud portion 30, and the other to the coupling head 2.

The blade carrying assembly 1 also includes a lock 5. In the position of the assembly seen in FIG. 1, this lock is inoperative (unlocked), while in FIG. 2 it is in a locked condition, in which the wiper arm 3 and the coupling head 2 are substantially aligned with each other.

Referring now to the cross sectional views of FIGS. 3 and 4, therein are show the assembly in the region in which the arm 3 is coupled with the coupling head 2. In these Figures the lock 5 is to be seen mounted in a through opening 31 formed in the shroud portion 30.

The lock 5 includes a cylindrical intermediate portion 51 having a height which is substantially equal to the thickness of the upper wall of the shroud portion. The cylindrical portion 51 is connected at one end to a substantially flat head portion 52, of larger diameter than the portion 51. The flat head portion 52 has an elongated slot 53 for engagement with a suitable tool for rotating the lock, such as a screwdriver or a coin.

The other end of the cylindrical intermediate portion 51 carries a portion of the lock in the form of a collar 54, the diameter of which is slightly greater than that of the portion 51. The collar 54 includes a radially extending locking finger 55.

As can be seen from FIGS. 7 and 8, the opening 31 in the shroud portion 30 is a hole comprising a circular portion 32 leading into a radially extending portion 33. The diameter of the intermediate portion 51 of the lock 5 is almost equal to, but slightly smaller than, that of the circular portion 32. The outer rim of the collar 54 thus has a diameter very slightly greater than that of the circular portion 32. As to the flat head portion 52, its diameter is substantially greater than that of the circular hole portion 32. Preferably, for obvious aesthetic reasons when the lock 5 is in place (FIG. 3 or FIG. 4) the flat head portion 52 is so dimensioned as to cover the hole 31 completely.

The finger 55 is almost equal in length to, but very slightly smaller than, the radial portion 33 of the hole, and is of the same shape.

It will be easy to see how the lock 5 is assembled on to the shroud portion 30. The lock 5 is offered to the outer surface 34 of the shroud portion and is then inserted into the hole 31 with the finger 55 aligned with the hole portion 33. Slots 56, formed in the collar 54 and best seen in FIG. 6, impart a degree of resilience which allows the collar to deform so that it can pass through the hole portion 32 and snap behind the inner face 35 of the shroud portion 30. The lock 5 is then in the position shown in FIG. 3, with the above mentioned traction spring biassing the shroud portion 30 towards the coupling head 2 until they bear against each other, with a shoulder 21 formed on the coupling head 2 (FIGS. 3 and 4) bearing against the inner face 35 of the shroud portion 30.

In order to limit the displacement of the wiper arm 3 with respect to the coupling head 2, the arm 3 and head 2 are rotated with respect to each other about the pivot axis 20 against the action of the spring, and the finger 55 is introduced between the shoulder 21 and the inner face 35. The finger 55 then acts as an abutment or wedge between the wiper arm 3 and the coupling head 2, preventing any further pivoting displacement under the action of the spring. On the other hand, the driver of the vehicle can, if necessary, continue the displacement against the action of the spring.

The finger 55 is introduced in a simple manner by rotating the lock 5 using a screwdriver or coin in the slot 53 which is provided on the head portion 52.

The angle through which the wiper arm 3 has been pivoted with respect to the coupling head 2 ensures the disengagement of the wiper blade from the windshield of the vehicle. The wiper blade, not shown, is fixed in the usual way to the free end 36 of the wiper arm 3.

In the operation of mounting the windshield wiper on the vehicle, the locked position allows the coupling head 2 to be fixed on to the vehicle without the free end 36 coming into contact with the windshield, and without there being any need to overcome the action of the spring. Once the wiper has been mounted in position, or a new blade has been fitted, all that is then necessary is to rotate the lock 5 back to a position in which the finger 55 is no longer in engagement with the shoulder 21. The spring is then reactivated.

In the embodiment shown in the drawings, the finger 55 has a shape and dimensions such that, in the position shown in FIG. 2 in which the lock is in its locking position, the blade carrying assembly 1 is generally rectilinear. However, in a modification the finger 55 may be made such that the wiper arm lies in any other desired position with respect to the coupling head 2. This will depend on the amount of pivoting displacement of the wiper arm which is possible without it making contact with the hood of the vehicle.

As shown in the drawings, the hole portion 33 lies radially opposite to the position in which the finger 55 lies when the lock is in its locking condition. This arrangement has the advantage that the shroud portion 30 is perforated without significantly affecting its rigidity. However, any other convenient position may be adopted for the hole portion 33, except a position overlying the locking position (FIG. 4) of the finger 55. Similarly, the slot 53 of the lock head 50 is orientated parallel to the finger 55 so as to indicate the position of the latter to the operator when the lock is being turned; but here again, any other orientation may be adopted if desired.

What is claimed is:

1. A blade carrying assembly for a windshield wiper, said assembly comprising:
   a coupling head;
   a wiper arm to carry at one end thereof a wiper blade and articulated at another end thereof to said coupling head about a pivot axis;
   spring means biassing said wiper arm about said pivot axis relative to said coupling head in a direction to urge said one end of said wiper arm to a windshield wiping operative position; and
   a lock member rotatably mounted on said wiper arm and having locking means for, upon rotation of said lock member to a locking position thereof, limiting the extent of rotation of said wiper arm about said pivot axis in said direction.

2. An assembly as claimed in claim 1, wherein when said lock member is in said locking position thereof the biassing force of said spring means remains applied to said wiper arm in said direction.

3. An assembly as claimed in claim 1, wherein said spring means is operable between and on said coupling head and said wiper arm.

4. An assembly as claimed in claim 1, wherein said locking means comprise a finger so disposed that, upon rotation of said member, said finger is introduced between said wiper arm and said coupling head.

5. An assembly as claimed in claim 1, wherein said wiper arm includes a shroud portion having a generally U-shaped cross section and having a through opening, said lock member being mounted in said through opening.

6. An assembly as claimed in claim 5, wherein said through opening formed in said shroud portion includes a circular portion and a radially extending portion continuous with and extending from said circular portion.

7. an assembly claimed in claim 5, wherein said lock member comprises an intermediate portion connected to a head portion, and a collar including said locking means.

8. An assembly as claimed in claim 7, wherein said collar is so dimensioned as to ensure a snap fit of said lock member on said shroud portion.

9. An assembly as claimed in claim 8, wherein said collar has formed therein slots to impart resilience to said collar.

10. An assembly as claimed in claim 7, further comprising a slot formed in said head portion to enable said lock member to be rotated by means of a flat tool.

* * * * *